United States Patent
Mendiratta et al.

(10) Patent No.: US 7,493,121 B2
(45) Date of Patent: Feb. 17, 2009

(54) PROCESSING CALLS FROM WIRELESS HANDSETS TO TOLL-FREE TELEPHONE NUMBERS

(75) Inventors: Veena B. Mendiratta, Oak Brook, IL (US); Tushar Shah, Lombard, IL (US); Gustavus H. Zimmerman, III, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 404 days.

(21) Appl. No.: 11/316,531

(22) Filed: Dec. 22, 2005

(65) Prior Publication Data

US 2007/0149202 A1    Jun. 28, 2007

(51) Int. Cl.
*H04Q 7/20* (2006.01)
(52) U.S. Cl. ........................ 455/445; 370/352
(58) Field of Classification Search .............. 455/432.1, 455/435.1, 445; 370/352, 356, 389, 401, 370/465
See application file for complete search history.

(56) References Cited

U.S. PATENT DOCUMENTS 5,742,667 A * 4/1998 Smith .................... 379/112.09

6,791,971 B1 * 9/2004 Osman et al. ............... 370/352

OTHER PUBLICATIONS

Lucent Tech.; Autoplex System 1000 . . . ; Technical Document describing funtions performed by equipment installed in Brazil; 9 pgs., 401-612-178, Issue 1; US., 1998.

* cited by examiner

*Primary Examiner*—Sam Bhattacharya

(57) ABSTRACT

In an exemplary method, a call origination request containing a toll-free telephone number of the called party is received from a wireless handset supported by a mobility service provider at a switching node of the telecommunication network. A determination is made if the called party has agreed to pay for at least a portion of the telecommunication service charge by the mobility service provider for providing wireless access to the wireless handset for the call. If the called party has agreed to pay for at least a portion of the telecommunication service charge by the mobility service provider, a call detail record associated with said call is generated that contains information indicating that the called party will be responsible for at least the portion of the telecommunication service charge by the mobility service provider. The call is then terminated to the called party.

20 Claims, 3 Drawing Sheets

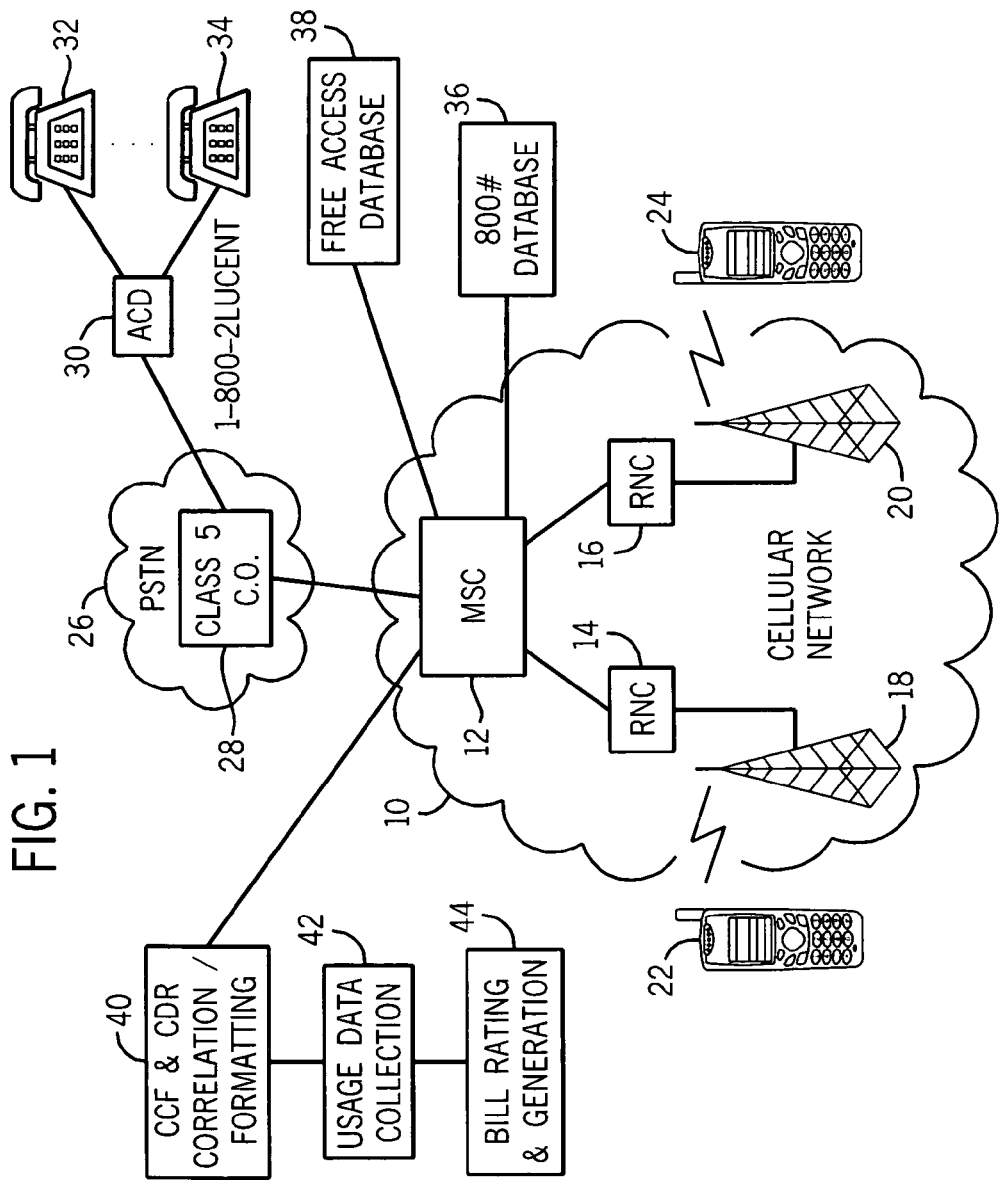
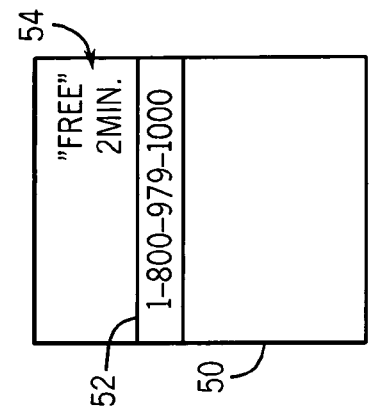
FIG. 1
FIG. 2

PROCESSING CALLS FROM WIRELESS HANDSETS TO TOLL-FREE TELEPHONE NUMBERS

CROSS-REFERENCE TO RELATED APPLICATION

This application contains subject matter that is related to the subject matter of the following application, which is assigned to the same assignee as this application. The below-listed application is hereby incorporated herein by reference in its entirety: "PROCESSING DATA CALLS FROM WIRELESS HANDSETS TO INFORMATION NODES," by Veena B. Mendiratta, et al., co-filed herewith.

BACKGROUND

The present invention is generally directed to wireless communications and more specifically to how charges for wireless communication calls are processed.

Mobility service providers, e.g. a provider of cellular services, offer a variety of calling plans to subscribers. Some calling plans may offer the subscriber unlimited, or virtually unlimited, inbound calls to a wireless handset without incurring a charge per call or minutes of air time used. Other plans offer subscribers unlimited inbound and outbound calls to a wireless handset without incurring a charge per call if the other party is also a subscriber of the same service provider. Service providers also offer calling plans with a low fixed monthly charge, but such plans normally include only a limited number of included minutes. Once a subscriber exceeds the limited number of included minutes, the subscriber will incur a charge per minute of wireless access service. This charge is in addition to any other charges, e.g. long distance or special services charges, accessed by other network providers.

Toll-free numbers have been in use in the United States for many years. Typically, a business or corporation will utilize a toll-free number to provide free telephone access by callers. This is typically offered as an inducement to do business with the business or corporation. A caller utilizing a land line telephone to call a business with an 800 toll-free number does not incur unit charges for this call. This is because the called business is billed for this service instead of the calling party.

Although a wireless subscriber can initiate a call from a wireless handset to a party with a toll-free number, e.g. a number is an 800 area code, the subscriber is still subject to the terms of the mobility service provider's calling plan selected by the subscriber. That is, the subscriber is still subject to a charge per minute of wireless air time used even when calling a telephone number with an assigned toll-free area code. Although mobility service providers are linked to the public switched telephone network, the mobility service providers are separate entities and hence wireless subscribers are subject to the separate billing plan of the mobility service providers. Thus, there exists a need for improved flexibility for handling the billing of calls originated by a wireless subscriber to traditional toll-free telephone numbers.

SUMMARY

The invention in one implementation encompasses a method. In an exemplary method, a call origination request containing a toll-free telephone number of the called party is received from a wireless handset supported by a mobility service provider at a switching node of the telecommunication network. A determination is made if the called party has agreed to pay for at least a portion of the telecommunication service charge by the mobility service provider for providing wireless access to the wireless handset for the call. If the called party has agreed to pay for at least a portion of the telecommunication service charge by the mobility service provider, a call detail record associated with said call is generated that contains information indicating that the called party will be responsible for at least the portion of the telecommunication service charge by the mobility service provider. The call is then terminated to the called party.

DESCRIPTION OF THE DRAWINGS

Features of exemplary implementations of the invention will become apparent from the description, the claims, and the accompanying drawings in which:

FIG. 1 is a block diagram of a communication system suited for incorporating an embodiment of the present invention.

FIG. 2 shows an exemplary screen display of a wireless handset in accordance with an embodiment of the present invention.

DETAILED DESCRIPTION

Figure 3A:
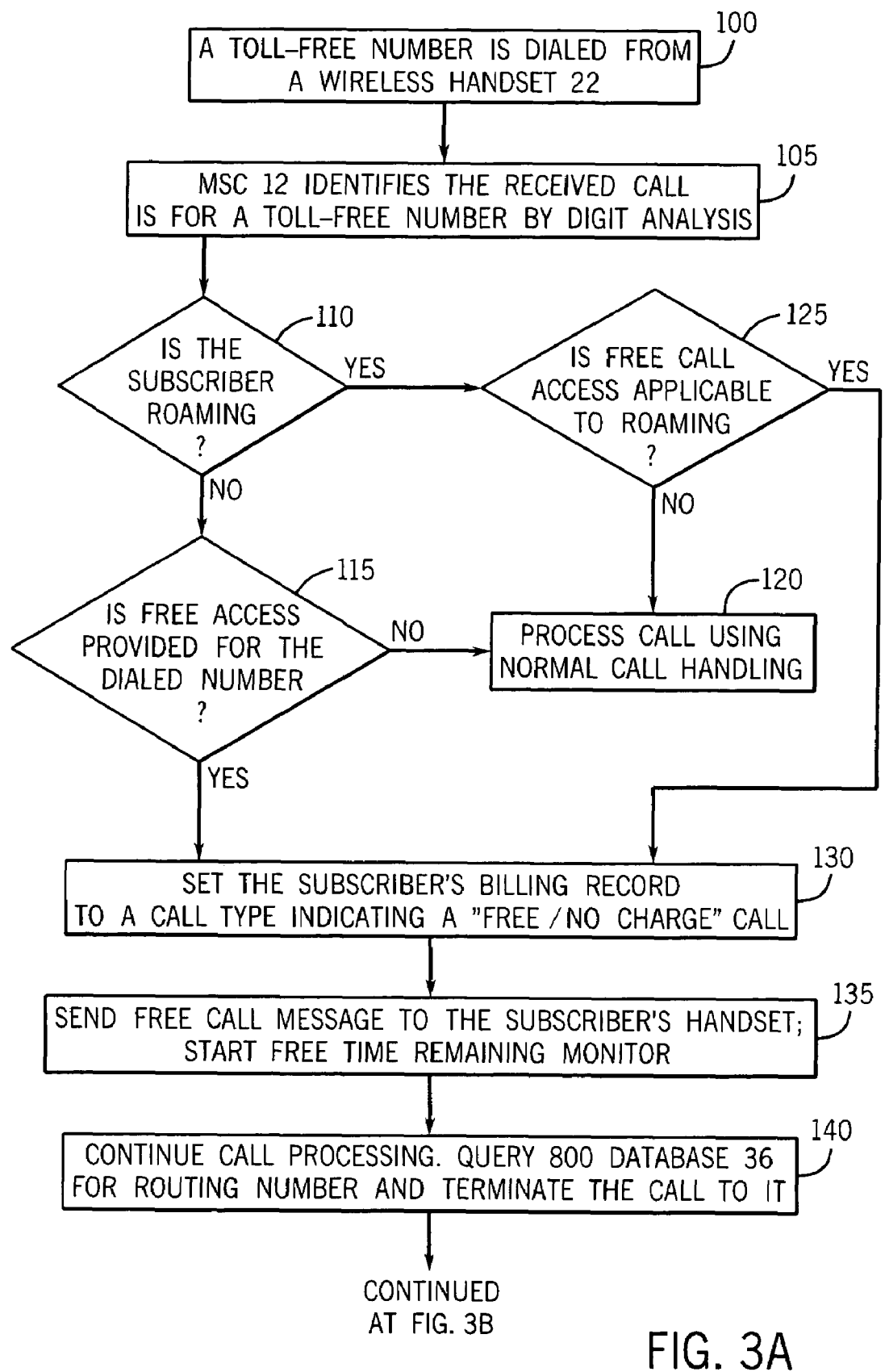
FIGS. 3A and 3B are flow diagrams of steps in accordance with an exemplary method of the present invention.

As will be explained with regard to an exemplary system diagram, an exemplary method of the present invention provides increased flexibility in determining how calls are charged that originate from a wireless handset to a called party having a conventional toll-free number. In accordance with the exemplary method, a called party with a toll-free number can elect to pay for all or only selected portions of wireless subscriber charges.

Referring to FIG. 1, a cellular network 10 includes a mobile switching center (MSC) 12 that supports radio network controllers (RNC) 14 and 16 that are each respectively coupled to cellular base station antennae 18 and 20. Exemplary wireless handsets 22 and 24 are located relative to the cellular network so as to have communication channels provided by antennae 18 and 20, respectively. The MSC 12 may comprise an executive cellular processor (ECP) or an Internet protocol (IP) multimedia subsystem (IMS) application server depending on whether the cellular network is based on traditional cellular intra-network signaling or IP packet based session initiation protocol (SIP) standards. The wireless handsets may comprise a traditional cellular telephone, personal digital assistant (PDA) with wireless communication capabilities, or a portable computing device such as a laptop computer with wireless communication capabilities.

The MSC 12 is supported by and coupled to a database 36 containing records with call handling information about individual toll-free numbers (800#'s) and a database 38 containing records that contain information about the toll-free called parties and/or the calling parties that it utilized to make a decision of how communication services will be billed where a call is originated from a wireless handset to a called party with the toll-free number.

The public switched telephone network (PSTN) 26 includes an exemplary class 5 central office 28 that is coupled to the MSC 12 of the cellular network and to an automatic call distributor (ACD) 30 that distributes incoming calls to a variety of agents located at telephone stations 32, 34. In this example, the ACD 30 is associated with a particular company and is utilized to accept and distribute incoming toll-free calls to the various agents.

The MSC 12 is also connected to the call charging function (CCF) and call detail record (CDR) correction and formatting workstation 40. It collects the call detailed records normally associated with call originations and terminations, and sorts this data to identify the originating party and called party for each call session. It is connected to the usage data collection node 42 that compiles the usage information for each subscriber. The usage data collection node 42 is connected to the bill rating and generation node 44 that makes a final calculation of the amount owed for each billing period per subscriber based on the compiled information supplied by node 42.

FIG. 2 shows an exemplary screen 50 of a wireless handset display capable of displaying alphanumeric characters as well as other symbols and indicia. As shown, row 52 of the screen 50 displays a toll-free number of a called party originated by the wireless subscriber handset. In accordance with a feature of the present invention, an area 54 of screen 50 is utilized to communicate to the subscriber that the call (or at least a portion of the call) to the dialed toll-free number will be "free" to the subscriber. That is, the call or the indicated portion of the call will not be billed to the subscriber by the subscriber's mobility service provider. The call or indicated portion of the call will be billed to the called party. In the illustrative example, the area 54 displays "FREE 2 min." indicating to the subscriber that the call will be free to the subscriber for up to two minutes. Preferably, the remaining free time to the subscriber will be periodically updated, e.g. each 30 seconds, so that the subscriber can determine how to manage the call in view of the remaining free time. Periodic messages from the network infrastructure to the subscriber handset can be utilized to control the information displayed an area 54. Alternatively, in the absence of receipt of such update messages, the subscriber handset itself can be utilized to provide a countdown of remaining free access time. It will be apparent to those skilled in the art that a variety of words, abbreviations, symbols or indicia can be utilized to convey to the subscriber that a call is being processed as free access to the subscriber.

Figure 3B:
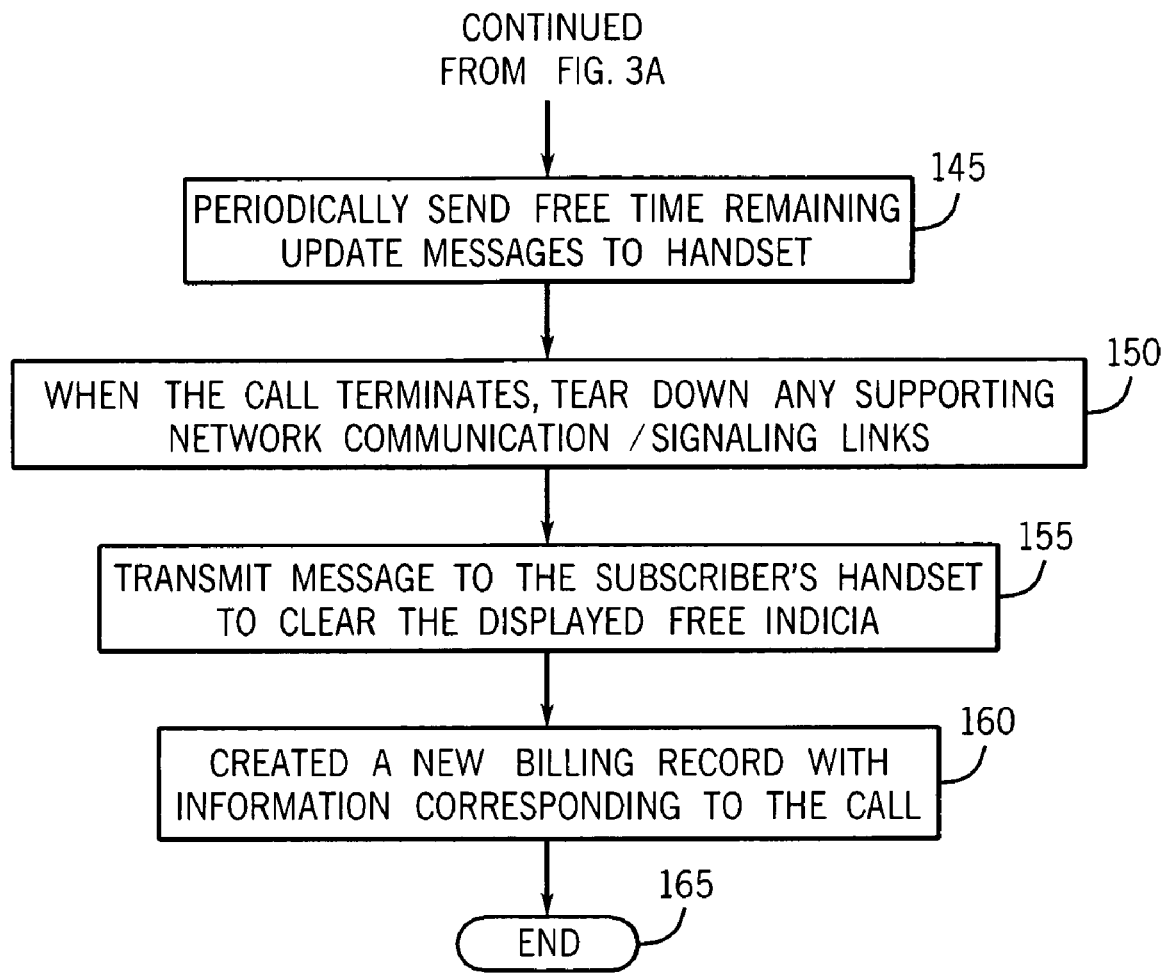

FIGS. 3A and 3B are a flow diagram showing steps in an exemplary method in accordance with the present invention. The flow diagram will be best understood by also referring to FIG. 1. In order to provide free access for wireless subscribers, the Company will have made arrangements with the service provider(s) responsible for maintaining the free access database 38 so that the Company's toll-free number will reside as a record in this database together with related call processing information. The call processing information may include a time limit for free access, and may further include other restrictions that may select only certain wireless subscribers to receive free access. For example, the Company may desire to limit free access to wireless subscribers that: (a) originate wireless calls from certain cellular networks; (b) originate wireless calls during a predetermined time interval; (c) have a predetermined area code; (d) originate wireless calls within a predetermined geographic area; (e) that are specifically identified in a database based on predetermined demographics such as age, household income, ZIP code, gender, customer lists, employer, etc. As will be known to those skilled in the art, the 800# database 36 will also contain a record with the 800 toll-free number of the Company and a corresponding routing telephone number that controls the routing of calls made to the toll-free number.

In step 100 a toll-free number is dialed from wireless handset 22. In this example the toll-free number consists of an 800 toll-free number of a company that utilizes ACD 30 to process the incoming toll-free calls. The Company provides up to three minutes of free access to wireless subscribers calling its toll-free number and has elected to provide this accommodation to all wireless handset users. In step 105 the MSC 12 identifies the received call from handset 22 as being directed to a toll-free number by utilizing digit analysis. In step 110 a determination is made whether the subscriber is roaming. As will be known to those skilled in the art, such a determination can be made based on information received from a local home location register (HLR), a local visitor location register (VLR), or a local authentication, authorization and accounting (AAA) server depending upon the type of cellular system.

A NO determination by step 110 results in step 115 determining if free access is to be provided based on the dialed number. The MSC 12 initiates a query containing the dialed number to the free access database 38. Based on information received in a reply from database 38, MSC 12 determines if free access is to be provided. A NO determination by step 115 results in the call being further processed using normal call handling as indicated in step 120.

A YES determination by step 110 results in step 125 making a determination if free call access is applicable to the roaming subscriber. The MSC 12 may transmit a query to the subscriber's home HLR, the local VLR, or the subscriber's home AAA server seeking a determination of whether free call access is to be applied to the roaming subscriber. Depending upon the telecommunication system design, providing such information will be made the responsibility called one of the appropriate nodes. A NO determination by step 125 results in the call being processed utilizing normal call handling as indicated in step 120.

A YES determination by step 125 or a YES determination by step 115 results in further processing at step 130. The subscriber's billing record is set to a call type indicating a free/no charge call. Preferably, this call type is specifically associated with this free access type of service. It will be understood that the generation of a billing record is a normal part of call processing and handling. For example, a CDR is normally generated upon call origination and upon call termination, where the CDR contains the calling party number, the called party number, call type, event code (origination, termination, etc.) and date/time information. In the illustrative example the CDR corresponding to the call origination would be sent by MSC 12 to the CCF and CDR correlation/formatting workstation 40.

In step 135 MSC 12 sends a free call message to the subscriber's handset 22 and begins to monitor the free time remaining. In this example, three minutes of free access time is provided. The free call message which includes the amount of free access time provided is received and processed by handset 22 to generate the predetermined free call access information in area 54 of the display screen 50. The free time monitor may consist of a periodically accessed countdown timer such as implemented in software. In step 140, the MSC 12 continues to process the call request and initiates a query to the 800 database 36 to seek a routing number to which the toll-free call will be terminated. In this example, database 36 identifies the 800 toll-free number and returns a routing number that corresponds with the port on central office switch 28 to which the ACD 30 is connected. The MSC 12 upon receiving call path routing instructions, as is known in the telecommunication field, proceeds to route the call request to the central office switch 28 which in turn terminates the call to the ACD 30.

In step 145 the MSC 12 periodically sends update messages to the handset 22 containing information that updates the remaining amount of free access time. This information is processed by handset 22 and is utilized to update the displayed amount of remaining free access time on its display screen. In step 150 the telecommunication infrastructure equipment initiates procedures upon call termination. This includes tearing down any supporting communications/signaling links associated with the call. In step 155 MSC 12 causes a message to be transmitted to the subscriber handset 22 to clear the displayed free call indicia. This message may consist of a separate message for this specific purpose or may be combined with a call termination message. In step 160 a call termination CDR that will be transmitted by MSC 12 to node 40 as part of the termination of the call. This concludes the processing as indicated by END step 165.

Periodically the CCF and CDR correlation/formatting workstation 40 processes the received call detail records and assembles the information on a per call and per subscriber basis. The usage data collection workstation 42 receives this processed information in further correlates the records to determine usage by each calling and/or called party for a predetermined period of time, e.g. typically for each month. The bill rating and generation workstation 44 further processes this information to apply the appropriate charges for telecommunications services to each calling and/or called party.

In the illustrative example, the toll-free call originated from handset 22 will be identified by call type indicating that the charges will be borne by the called party for a predetermined amount time. Any applicable charges for a call duration exceeding the predetermined amount of time will be billed to the party responsible for charges for the use of handset 22.

A variety of options exist with regard to call management when the predetermined amount of time for free call access expires or is about to expire. In addition to providing the subscriber with a continuing visual update of the amount of time remaining in the free call access period, a visual message can be provided shortly before the free call time expires advising the subscriber that continuation of the call will result in normal call service charges being applied for which the subscriber will be responsible. Alternatively, an affirmative action may be required by the subscriber in order to maintain the call beyond the expiration of the free time interval. That is, the subscriber may be required press a key/button on the handset or generate a verbal acceptance that will be transmitted to and processed by the MSC 12 in order to maintain the call connection. If the MSC 12 does not receive this indication, an automatic call disconnection can be effected. The subscriber may also be provided with an audible signal such as a beep near the expiration time as an additional alert, which may be especially appropriate since the display screen may not be easily visible to the subscriber because of the orientation of the handset during an ongoing conversation. Predetermined audible alerts can be provided periodically to correspond with the remaining amount of free time. For example a pattern of beeps can be utilized such as sets of 1, 2 and 3 consecutive beeps that would correspond to one minute, 30 seconds and 15 seconds remaining, respectively.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims. For example, the functionality associated with one node could be distributed to other nodes in the network as well as additional functionality being assumed by a node.

We claim:

1. A method for processing calls comprising the steps of:
   receiving a call origination request from a wireless handset supported by a mobility service provider at a switching node of the telecommunication network, the call origination request containing a telephone number of the called party;
   determining if the telephone number of the called party is a toll-free number;
   if the telephone number is a toll-free number, determining if the called party has agreed to pay for at least a portion of the telecommunication service charge by the mobility service provider for providing wireless access to the wireless handset for the call;
   if the called party has agreed to pay for at least a portion of the telecommunication service charge by the mobility service provider, generating a call detail record associated with said call that contains information indicating that the called party will be responsible for at least the portion of the telecommunication service charge by the mobility service provider;
   terminating the call to the called party.

2. The method of claim 1 further comprising the steps of:
   determining if the wireless handset has been granted access to the mobility service provider's wireless network as a roamer;
   if the wireless handset is determined to be a roamer, generating a query from a node in the mobility service provider's wireless network to a home network of the wireless subscriber, where the query seeks information to determine whether the called party has agreed to pay for at least a portion of the telecommunication service charge assessed by mobility service providers for providing wireless access to the wireless handset associated with a call to the called party;
   receiving a reply to the query;
   if the called party has agreed to pay for at least a portion of the telecommunication service charge by the mobility service provider as determined by information contained within the reply, generating a call detail record associated with the call that contains information indicating that the called party will be responsible for at least a portion of the telecommunication service charge by the mobility service provider for the roaming wireless handset;
   terminating the call to the called party.

3. The method of claim 1 further comprising the step of transmitting a message to the wireless subscriber handset representing that the called party has agreed to pay for at least a portion of the telecommunication service charge assessed, by the mobility service provider.

4. The method of claim 3 wherein the message contains time information indicating a time duration for which the called party has agreed to pay for the telecommunication service charge assessed by the mobility service provider.

5. The method of claim 4 further comprising the step of transmitting another message to the wireless subscriber handset representing an update as to the remaining time for which the called party has agreed to pay the telecommunications service charge assessed by the mobility service provider.

6. The method of claim 5 wherein the another message contains a command understood by the wireless subscriber handset to cause an audible alert to be generated by the wireless subscriber handset that is indicative of the remaining time for which the called party has agreed to pay the telecommunication service charge assessed by the mobility service provider.

7. The method of claim 1 further comprising the step of displaying on the screen of the wireless handset indicia indicating that at least a portion of the telecommunications service charge by the mobility service provider will be paid by the calling party for the current originated call from the wireless handset.

8. The method of claim 7 wherein the step of displaying further comprises displaying on the screen of the wireless handset time information indicating a remaining duration of time for which the called party agrees to pay the telecommunication service charge by the mobile the service provider.

9. The method of claim 1 wherein the step of determining if the called party has agreed to pay for at least a portion of the telecommunication service charge by the mobility service provider comprises transmitting a query to a database, where the query contains the toll-free number of the called party, identifying a record in the data base associated with the toll-free number, and determining from information contained in the record whether the called party agrees to pay for at least a portion of the telecommunication service charge by mobility service providers for a call made to the toll-free number called the called party.

10. The method of claim 9 wherein the step of transmitting the query to the database comprises sending the query to the database which is separate from a database utilized to translate toll-free telephone numbers into routing numbers.

11. The method of claim 1 wherein the step of determining if the called party has agreed to pay for at least a portion of the telecommunication service charge by the ability service provider comprises determining if the calling party matches a predetermined selection criteria.

12. The method of claim 11 wherein the predetermined selection criteria comprises demographic information associated with the calling party.

13. The method of claim 1 further comprising the steps of:
receiving call detail records associated with the call, where the call detail records identify the calling party, called party and a call type wherein the call type identifies the call as being at least partially paid for by the called party;
processing the call detail records to generate billing statements wherein the called party is billed for the at least portion of the telecommunication service charge by the mobility service provider.

14. The method of claim 1 wherein the telecommunication service charge is for over-the-air time used by the wireless handset during the toll-free call.

15. The method of claim 14 wherein wireless handset is a cellular telephone and the mobility service provider is a cellular service provider.

16. A method for processing calls comprising the steps of:
transmitting a call origination request to a called party having a toll-free number from a wireless handset supported by a mobility service provider to a switching node of a telecommunication network, the call origination request containing a toll-free telephone number of the called party;
receiving by the wireless handset a message from the switching node indicating that the called party has agreed to pay for at least a portion of the telecommunication service charge accessed by the mobility service provider for providing wireless communications to the wireless handset for the call;
displaying, in response to receiving the message, on the screen of the wireless handset indicia indicating that the called party has agreed to pay for at least a portion of the telecommunication service charge accessed by the mobility service provider.

17. The method of claim 16 wherein the displaying step displays the word FREE on the screen.

18. The method of claim 16 wherein the step of displaying comprises the step of displaying, based on information contained in the message, on the screen of the wireless handset an amount of time for which the called party has agreed to pay the telecommunication service charge accessed by the mobility service provider.

19. The method of claim 16 wherein the step of displaying comprises the step of displaying, based on information contained in the message, on the screen of the wireless handset a periodically updated amount of time remaining for which the called party has agreed to pay the telecommunication service charge accessed by the mobility service provider.

20. The method of claim 16 wherein the telecommunication service charge is for over-the-air time used by the wireless handset during the toll-free call.

* * * * *